US011580721B2

(12) United States Patent
Iwamoto

(10) Patent No.: US 11,580,721 B2
(45) Date of Patent: Feb. 14, 2023

(54) INFORMATION PROCESSING APPARATUS, CONTROL METHOD, AND PROGRAM

(71) Applicant: NEC CORPORATION, Tokyo (JP)

(72) Inventor: Kota Iwamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 308 days.

(21) Appl. No.: 16/759,164

(22) PCT Filed: Nov. 7, 2017

(86) PCT No.: PCT/JP2017/040082
§ 371 (c)(1),
(2) Date: Apr. 24, 2020

(87) PCT Pub. No.: WO2019/092782
PCT Pub. Date: May 16, 2019

(65) Prior Publication Data
US 2021/0174129 A1 Jun. 10, 2021

(51) Int. Cl.
*G06V 10/40* (2022.01)
*G06V 10/75* (2022.01)
(Continued)

(52) U.S. Cl.
CPC ......... *G06V 10/751* (2022.01); *G06K 9/6215* (2013.01); *G06V 10/25* (2022.01); *G06V 10/40* (2022.01)

(58) Field of Classification Search
CPC ...... G06V 10/751; G06V 10/25; G06V 10/40; G06V 10/759; G06V 10/48; G06V 10/757; G06K 9/6215; G06T 7/00
(Continued)

(56) References Cited

U.S. PATENT DOCUMENTS 7,627,178 B2 * 12/2009 Suzuki ................. G06V 10/757
382/209
8,401,308 B2 * 3/2013 Nakamura ........... G06V 10/757
382/209
(Continued)

FOREIGN PATENT DOCUMENTS

JP 2008-287438 A 11/2008
JP 2014-102810 A 6/2014
(Continued)

OTHER PUBLICATIONS

International Search Report of PCT/JP2017/040082 dated Jan. 30, 2018 [PCT/ISA/210].

*Primary Examiner* — Sheela C Chawan
(74) *Attorney, Agent, or Firm* — Sughrue Mion, PLLC

(57) ABSTRACT

The information processing apparatus (2000) includes a feature point detection unit (2020), a determination unit (2040), an extraction unit (2060), and a comparison unit (2080). A feature point detection unit (2020) detects a plurality of feature points from the query image. The determination unit (2040) determines, for each feature point, one or more object images estimated to include the feature point. The extraction unit (2060) extracts an object region estimated to include the object in the query image in association with the object image of the object estimated to be included in the object region, on the basis of the result of the determination. The comparison unit (2080) cross-checks the object region with the object image associated with the object region and determines an object included in the object region.

11 Claims, 15 Drawing Sheets

(51) Int. Cl.
  *G06K 9/62*    (2022.01)
  *G06V 10/25*   (2022.01)
(58) Field of Classification Search
  USPC ....... 382/100, 107, 195, 232, 236, 243, 181,
              382/190; 700/83; 717/116
  See application file for complete search history.

(56) References Cited

U.S. PATENT DOCUMENTS

| | | | |
|---|---|---|---|
| 9,076,064 B2 * | 7/2015 | Shiiyama | G06V 10/757 |
| 2014/0254940 A1 | 9/2014 | Shiiyama et al. | |
| 2015/0294193 A1 * | 10/2015 | Tate | G08G 1/0141 |
| | | | 382/159 |
| 2017/0017862 A1 | 1/2017 | Konishi | |
| 2017/0053393 A1 * | 2/2017 | Tzao | G06F 16/5854 |

FOREIGN PATENT DOCUMENTS

| | | |
|---|---|---|
| JP | 2014-197386 A | 10/2014 |
| WO | 2014/002554 A1 | 1/2014 |
| WO | 2015/136714 A1 | 9/2015 |

* cited by examiner

OBJECT INFORMATION

| OBJECT IDENTIFIER | OBJECT IDENTIFIER | LOCAL FEATURE VALUE |
|---|---|---|
| OBJECT 1 | 1 | (P11, f11), (P12, f12),··· |
| OBJECT 2 | 2 | (P21, f21), (P22, f22),··· |
| OBJECT 3 | 3 | (P31, f31), (P32, f32),··· |
| ··· | ··· | ··· |

OBJECT REGION IS EXTRACTED IN ASSOCIATION WITH OBJECT IMAGE

OBJECT IMAGE 1          OBJECT IMAGE 2          OBJECT IMAGE 3

CONVERSION INTO POSITIONS CORRESPONDING TO REFERENCE POSITION IN OBJECT IMAGE

INFORMATION PROCESSING APPARATUS, CONTROL METHOD, AND PROGRAM

CROSS REFERENCE TO RELATED APPLICATIONS

This application is a National Stage of International Application No. PCT/JP2017/040082, filed Nov. 7, 2017.

TECHNICAL FIELD

The present invention relates to image analysis.

BACKGROUND ART

Techniques for determining objects included in an image have been developed. For example, Patent Document 1 discloses a technique to cluster a plurality of feature points detected from a first image, and compare a feature value of feature points detected from the first image and a feature value of feature points included in a second image to be compared for each cluster. Patent Document 2 discloses a technique of narrowing down image candidates including the feature points included in a query image and then comparing the query image and each candidate image by using an index table in which a feature value is associated with a sequence of similar feature values.

RELATED DOCUMENT

Patent Document

[Patent Document 1] International Publication No. WO 2014/002554
[Patent Document 2] Japanese Patent Application Publication No. 2008-287438

SUMMARY OF THE INVENTION

Technical Problem

In Patent Document 1, since it is necessary to compare each cluster with all the second images, the time necessary for the comparing process in each cluster becomes longer. In Patent Document 2, it is assumed that the query image includes one object, and there is no description of a case where the query image includes a plurality of objects.

The present invention has been made in view of the above problems. An object of the present invention is to provide a technique of shortening the time necessary for determining each object included in a query image when a plurality of objects are included in the query image.

Solution to Problem

An information processing apparatus of the present invention includes: 1) a feature point detection unit that acquires a query image including a plurality of objects and detecting a plurality of feature points from the acquired query image; 2) a determination unit that determines one or more object images estimated to include the feature point for each feature point; 3) an extraction unit that extracts an object region estimated to include an object in the query image in association with an object image of the object estimated to be included in the object region, on the basis of a result of the determination; and 4) a comparison unit that cross-checks the object region with the object image associated with the object region and determines an object included in the object region.

The control method of the present invention is a control method executed by a computer. The control method includes: 1) a feature point detecting step of acquiring a query image including a plurality of objects and detecting a plurality of the feature points from the acquired query image; 2) a determining step of determining one or more object images estimated to include the feature point for each feature point; 3) an extracting step of extracting an object region estimated to include an object in the query image in association with an object image of the object estimated to be included in the object region, on the basis of a result of the determination; and 4) a cross-checking step of cross-checking the object region with the object image associated with the object region and determining an object included in the object region.

The program of the present invention causes a computer to perform each step of the control method of the present invention.

Advantageous Effects of Invention

According to the present invention, there is provided a technique of shortening the time necessary for determining each object included in a query image when the query image includes a plurality of objects.

BRIEF DESCRIPTION OF THE DRAWINGS

The above-described object and other objects, features, and advantages will be further clarified by the preferred example embodiments described below and the following drawings attached thereto.

DESCRIPTION OF EMBODIMENTS

Figure 1:
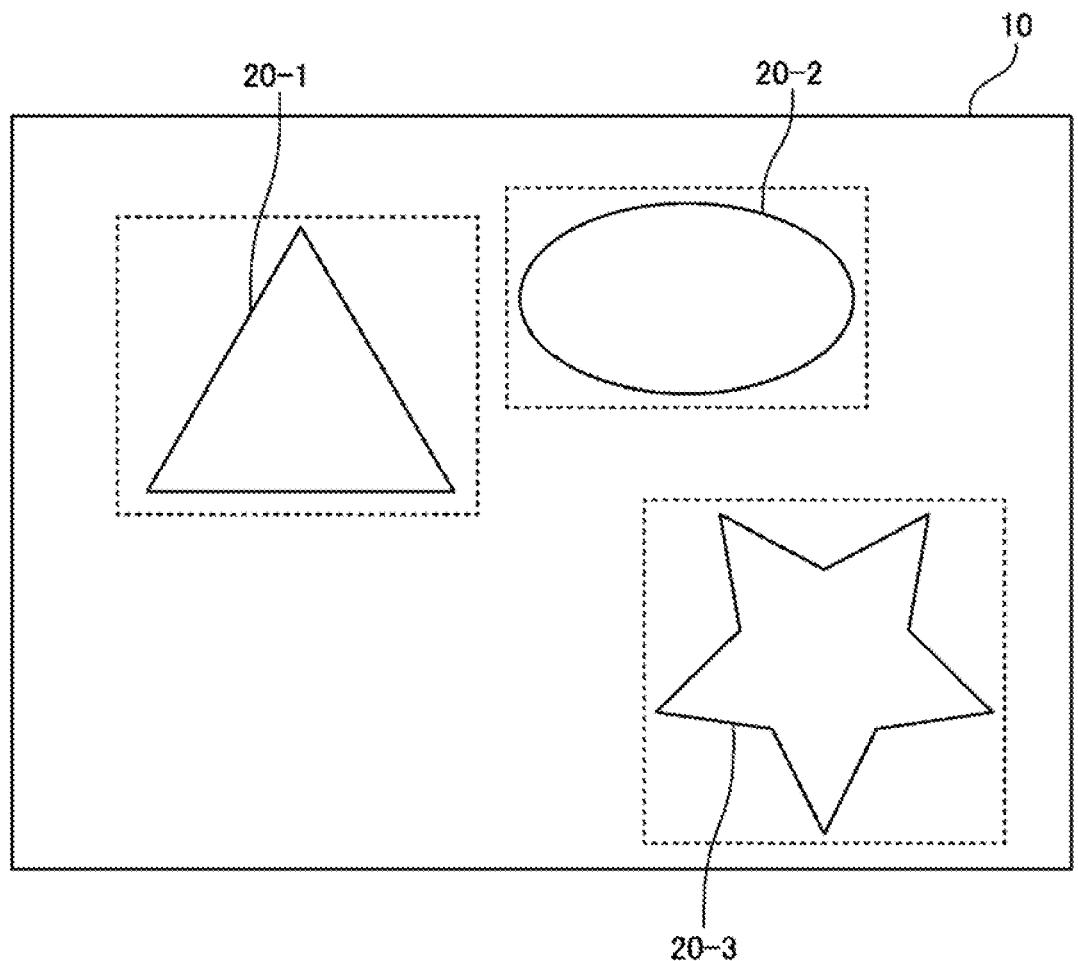
FIG. 1 is a diagram illustrating a query image to be processed by an information processing apparatus.

Hereinafter, example embodiments of the present invention will be described with reference to the drawings. In all the drawings, the same reference numerals are given to the same components, and the description will not be repeated as appropriate. Further, unless otherwise determined, in each block diagram, each block represents not a hardware unit configuration but a functional unit configuration.

First Example Embodiment

<Overview of Operation of Information Processing Apparatus 2000>

Figure 2:
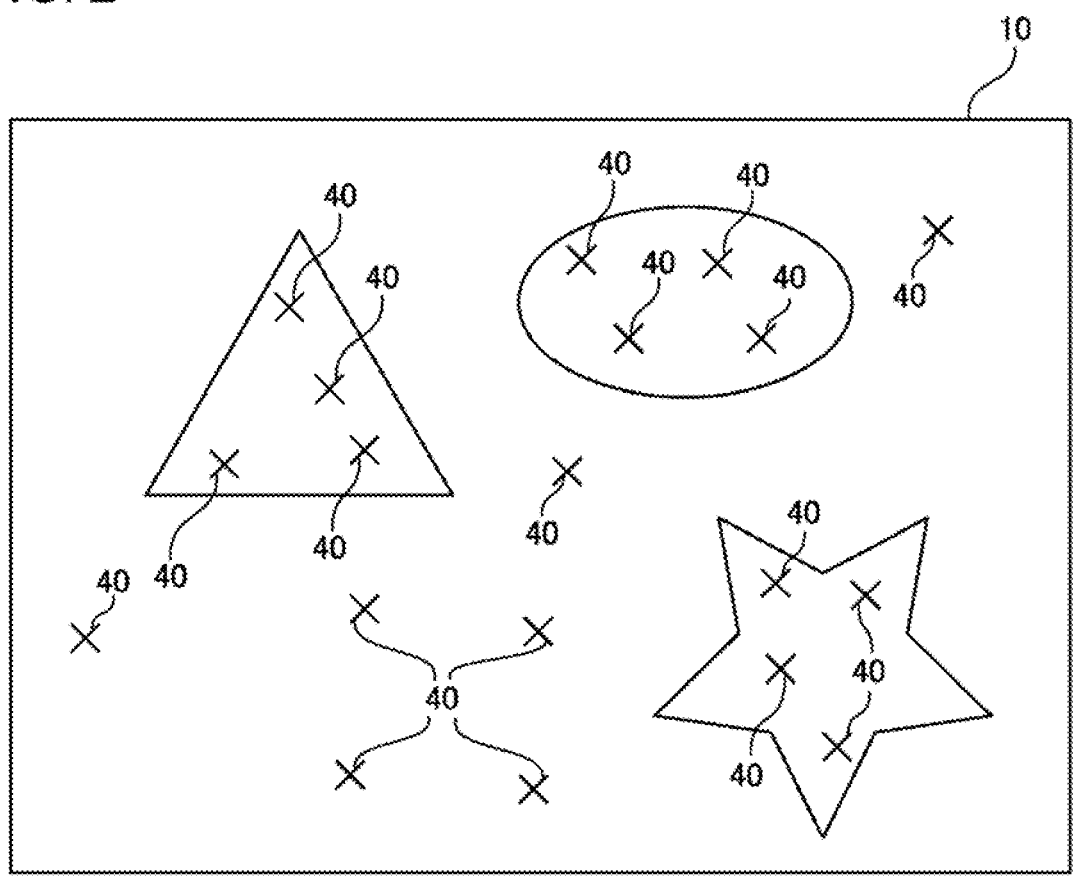
FIG. 2 is a diagram illustrating feature points included in a query image.

FIGS. 1 to 5 are diagrams for conceptually explaining the operation of the information processing apparatus according to a first example embodiment (the information processing apparatus 2000 shown in FIG. 2 and the like described later). FIGS. 1 to 5 are diagrams for the purpose of facilitating the understanding of the operation of the information processing apparatus 2000, and FIG. 1 does not limit the operation of the information processing apparatus 2000.

The information processing apparatus 2000 acquires a query image. FIG. 1 is a diagram illustrating the query image to be processed by the information processing apparatus 2000. The query image 10 is image data including a plurality of objects. For example, in FIG. 1, the query image 10 includes an object 20-1, an object 20-2, and an object 20-3. Any object can be adopted. For example, the object may be a product sold in a store.

The information processing apparatus 2000 performs processing of determining each object included in the query image 10. It is a premise that object information, which is information about each object, is provided. The object information indicates "an identifier of the object, an image identifier of an object image, and a local feature value of each feature point in the object image" for each object.

The identifier of the object is, for example, a name of the object (such as a product name) or a code (for example, a Japanese article number (JAN) code) assigned to the object. The image identifier of the object image is, for example, a file name of an image file of the object image. A feature point is represented by a coordinate position in the query image 10, for example. In FIG. 1, Pij represents a coordinate position of a feature point. fij represents a local feature value of the feature point at the position Pij (i and j are both integers).

The information processing apparatus 2000 detects a plurality of feature points from the query image 10. FIG. 2 is a diagram illustrating an example of feature points included in the query image 10. In FIG. 2, the feature points are indicated by crosses, and are denoted by reference numeral 40.

The information processing apparatus 2000 determines the objects included in the query image 10 by comparing the feature points 40 in the query image 10 with the feature points in each object image. However, at this time, the information processing apparatus 2000 narrows down the feature points used for the comparison, instead of comparing the feature points 40 in the query image 10 with the feature points in each object image on a brute force basis. Specifically, the following processing is performed.

First, the information processing apparatus 2000 determines one or more object images that are estimated to include the feature point 40, for each feature point 40 in the query image 10. This determination is performed by a method that can be performed at a higher speed than a method of comparing the feature points on the brute force basis, for example, by using an index table configured to be able to search for the object images on the basis of the local feature values. The specific method will be described later.

Figure 3:
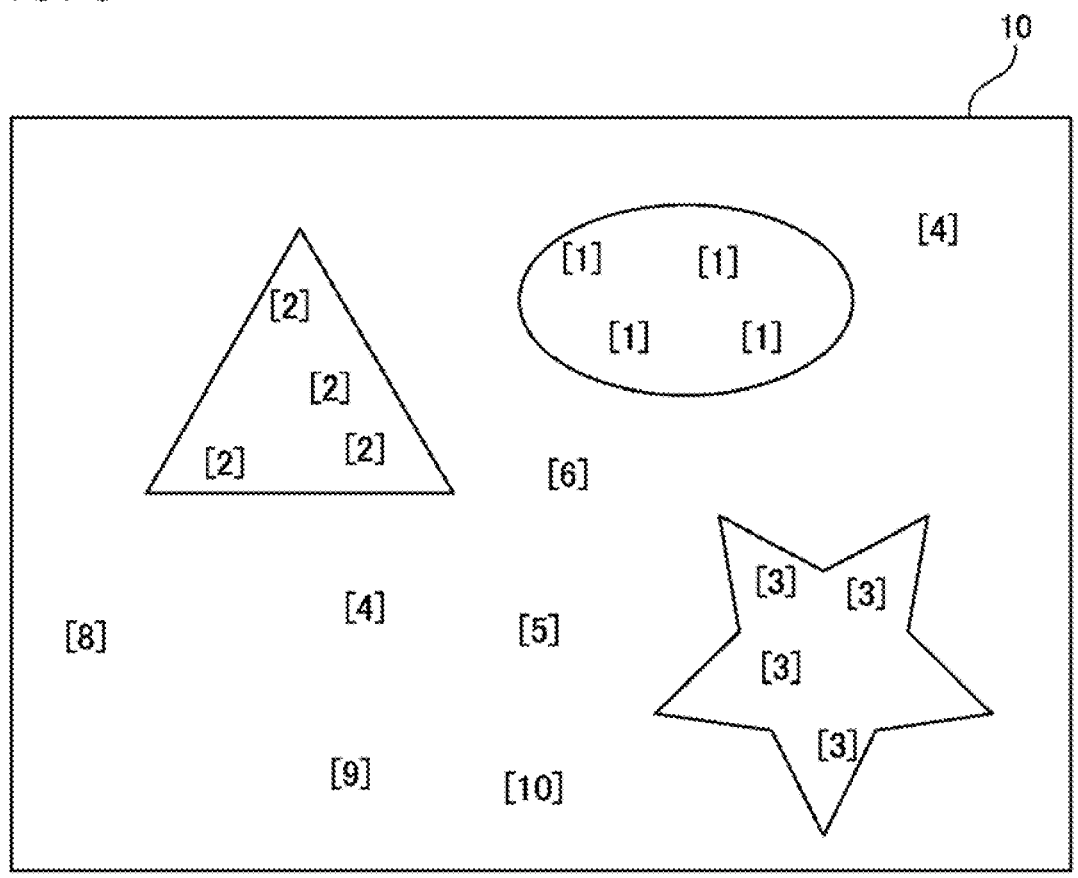
FIG. 3 is a diagram illustrating a situation where object images estimated to include feature points 40 are determined.

FIG. 3 is a diagram illustrating an example of a situation where an object image estimated to include the feature point 40 is determined for each feature point 40. In the query image 10 of FIG. 3, numerical values in parentheses are shown at positions of the feature points 40 in FIG. 2. Each numerical value indicates the image identifier of the object image. For example, it is indicated that the image identifier of the object image estimated to include the feature point 40 of the position with [1] is 1. Hereinafter, an object image whose identifier is i is also referred to as an object image i. The object represented by the object image i is referred to as an object i. An object image estimated to include a feature point is also referred to as an "object image corresponding to the feature point".

Here, it can be inferred that an image region including feature points corresponding to a common object image is highly likely to be an image region representing an object of that object image. For example, in FIG. 3, the image region including the feature point indicated by [1] is highly likely to be an image region representing the object (that is, object 1) represented by the object image 1.

Figure 4:
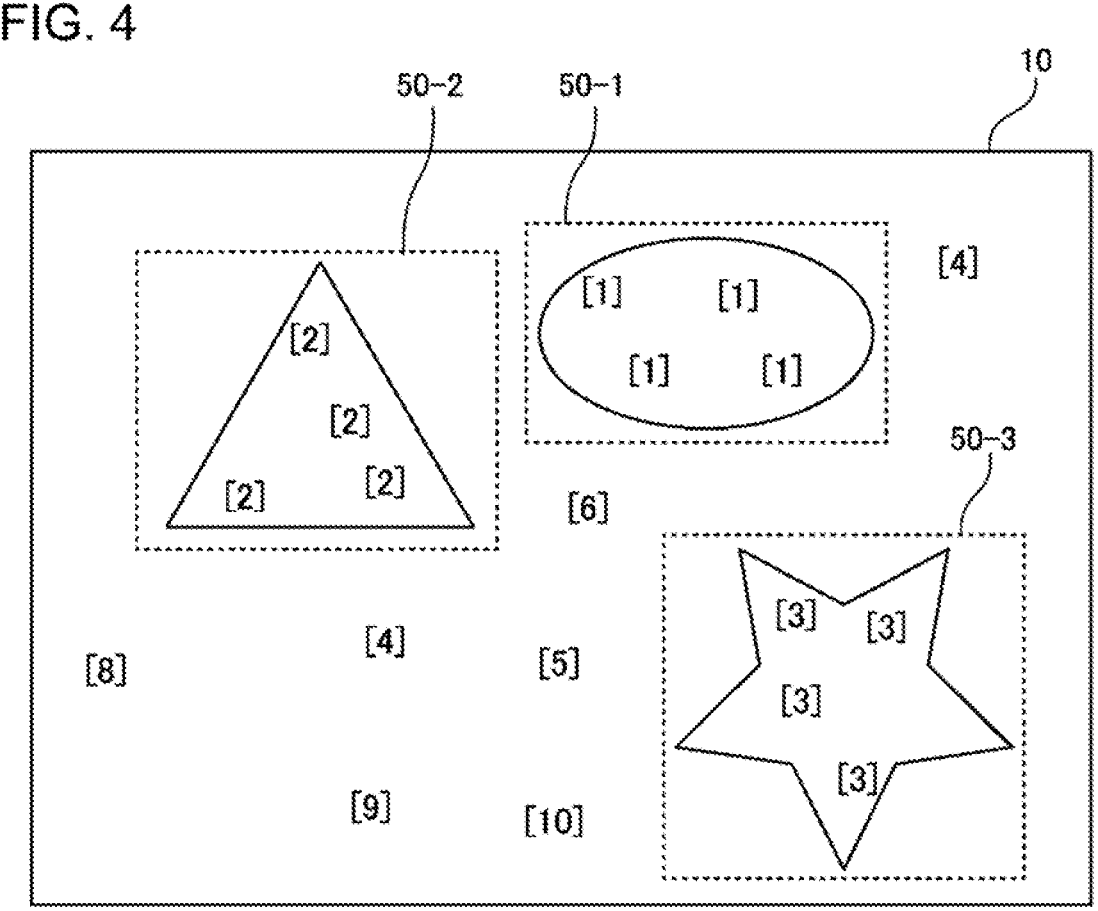
FIG. 4 is a diagram illustrating object regions.
Figure 4:
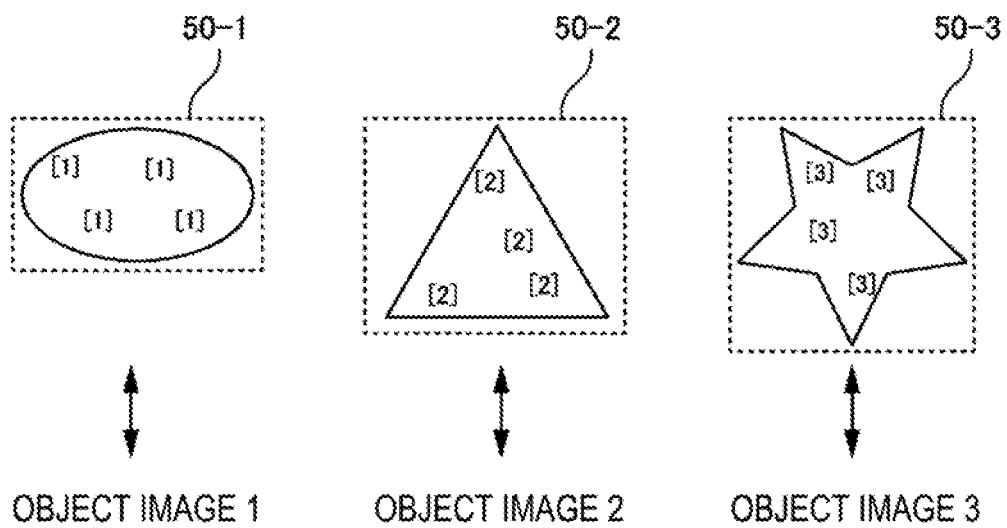

Therefore, on the basis of the correspondence relationship between the feature points 40 and the object images, the information processing apparatus 2000 extracts an image region (hereinafter, an object region) in the query image 10 estimated to include an object in association with the object image of the object estimated to be included in the object region. FIG. 4 is a diagram illustrating object regions. In FIG. 4, each object region is represented by the reference numeral 50. According to the correspondence relationship between the feature points 40 and the object images shown in FIG. 3, the object region 50-1, the object region 50-2, and the object region 50-3 are respectively extracted in association with the object image 1, the object image 2, and the object image 3.

Figure 5:
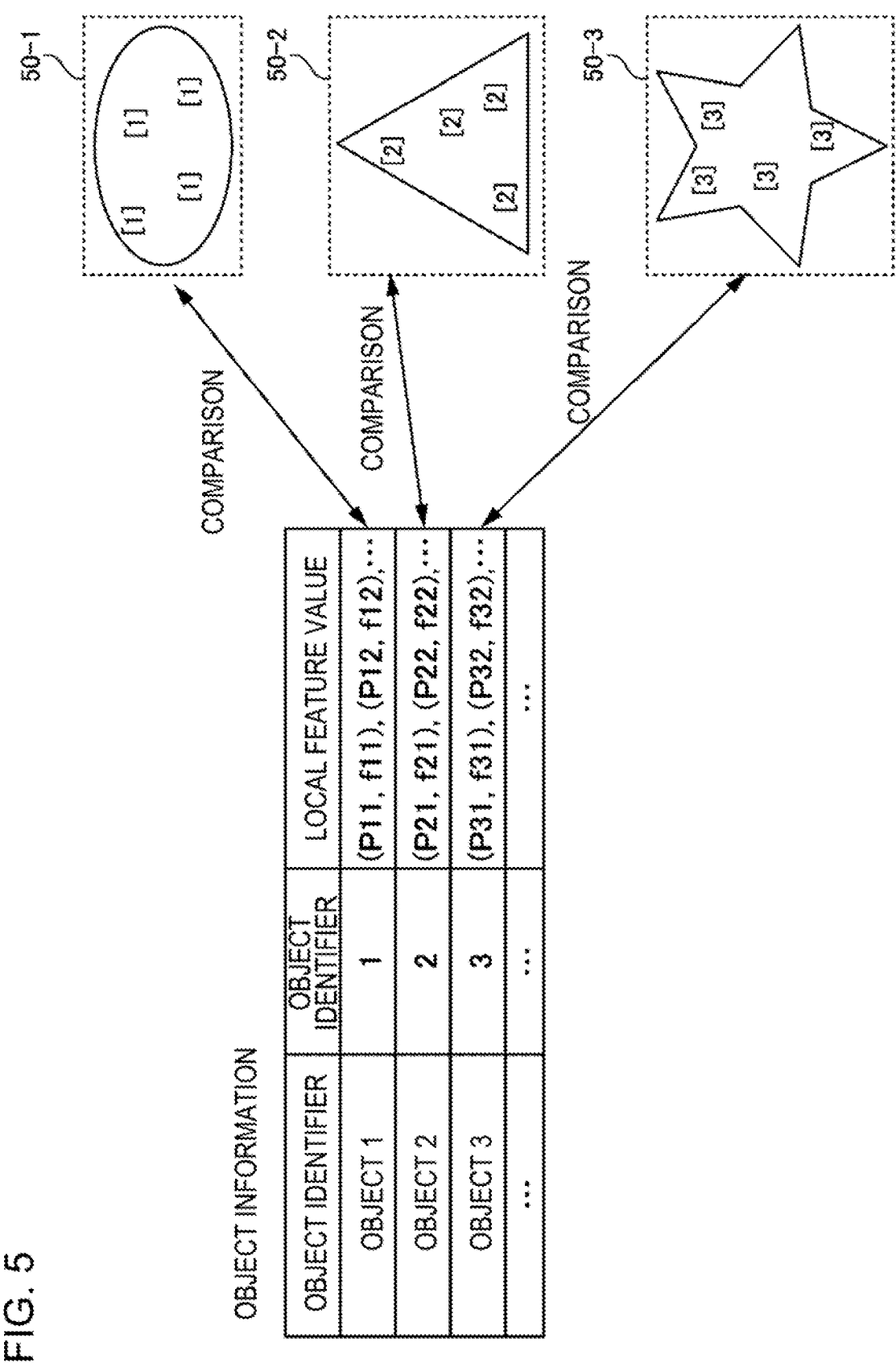
FIG. 5 is a diagram illustrating cross-checking between object regions and object images.

The information processing apparatus 2000 determines the object included in the object regions 50 by performing comparisons regarding the association obtained as described above. FIG. 5 is a diagram illustrating an example of comparisons between the object regions 50 and the object images. The object region 50-1, the object region 50-2, and the object region 50-3 are compared with the object image 1, the object image 2, and the object image 3, respectively. As a result, the information processing apparatus 2000 determines that the query image 10 includes the object 1, the object 2, and the object 3.

Advantageous Effects

According to the information processing apparatus 2000 of the present example embodiment, for each feature point 40 in the query image 10, an object image estimated to include the feature point 40 is determined. Further, on the basis of the correspondence relationship between the feature point 40 and the object image, the object region estimated to include the object is determined from the query image 10 in association with the object image of the object estimated to be included in the object region. Then, the object included in the object region is determined by comparing the object region with the object image associated with the object region.

Here, the determination of the object image estimated to include the feature point 40 is performed using a method that is faster than the method of comparison between the object region and the object image. For example, an object image estimated to include the feature point 40 is determined using an index table, while the comparison between the object region and the object image is performed by a detailed comparison between the feature points.

As described above, according to the information processing apparatus 2000, before the detailed comparison between the query image 10 and the object image is performed, in a method that is faster than the method of the detailed comparison, 1) image regions estimated to include objects in the query image 10 are narrowed down, and 2) object images to be compared with the image regions are narrowed down. Therefore, it is possible to reduce the time necessary for determining each object included in the query image 10 as compared with a method of comparing the query image 10 and the object image in detail without performing such narrowing.

Hereinafter, the information processing apparatus 2000 of the present example embodiment will be described in more detail.

<Example of Functional Configuration of Information Processing Apparatus 2000>

Figure 6:
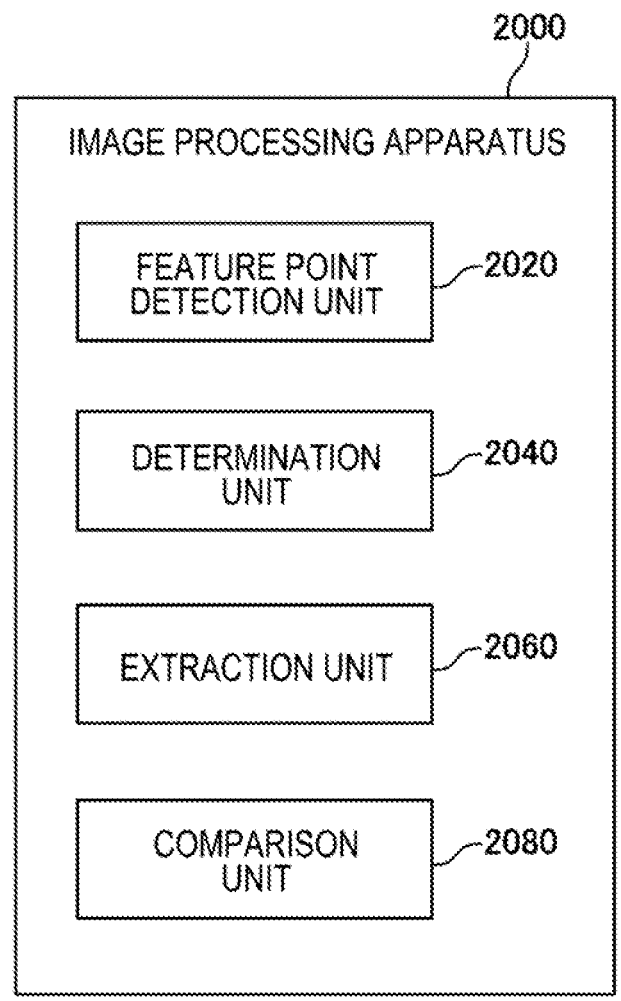
FIG. 6 is a block diagram illustrating an example of a functional configuration of the information processing apparatus according to a first example embodiment.

FIG. 6 is a block diagram illustrating an example of a functional configuration of the information processing apparatus 2000 according to the first example embodiment. The information processing apparatus 2000 includes a feature point detection unit 2020, a determination unit 2040, an extraction unit 2060, and a comparison unit 2080. The feature point detection unit 2020 detects a plurality of feature points 40 from the query image 10. The determination unit 2040 determines, for each feature point 40, one or more object images estimated to include the feature point 40. The extraction unit 2060 extracts the object regions 50 in association with the object images of the objects estimated to be included in the object regions 50 on the basis of the result of the determination. The comparison unit 2080 determines the objects included in the object regions 50 by comparing the object regions 50 with the object images associated with the object regions 50.

<Example of Hardware Configuration of Information Processing Apparatus 2000>

Each functional component of the information processing apparatus 2000 may be implemented by hardware (such as a hard-wired electronic circuit) that implements each functional component, or may be implemented by a combination of hardware and software (such as a combination of an electronic circuit and a program for controlling the electronic circuit). Hereinafter, the case where each functional component of the information processing apparatus 2000 is implemented by the combination of hardware and software will be further described.

Figure 7:
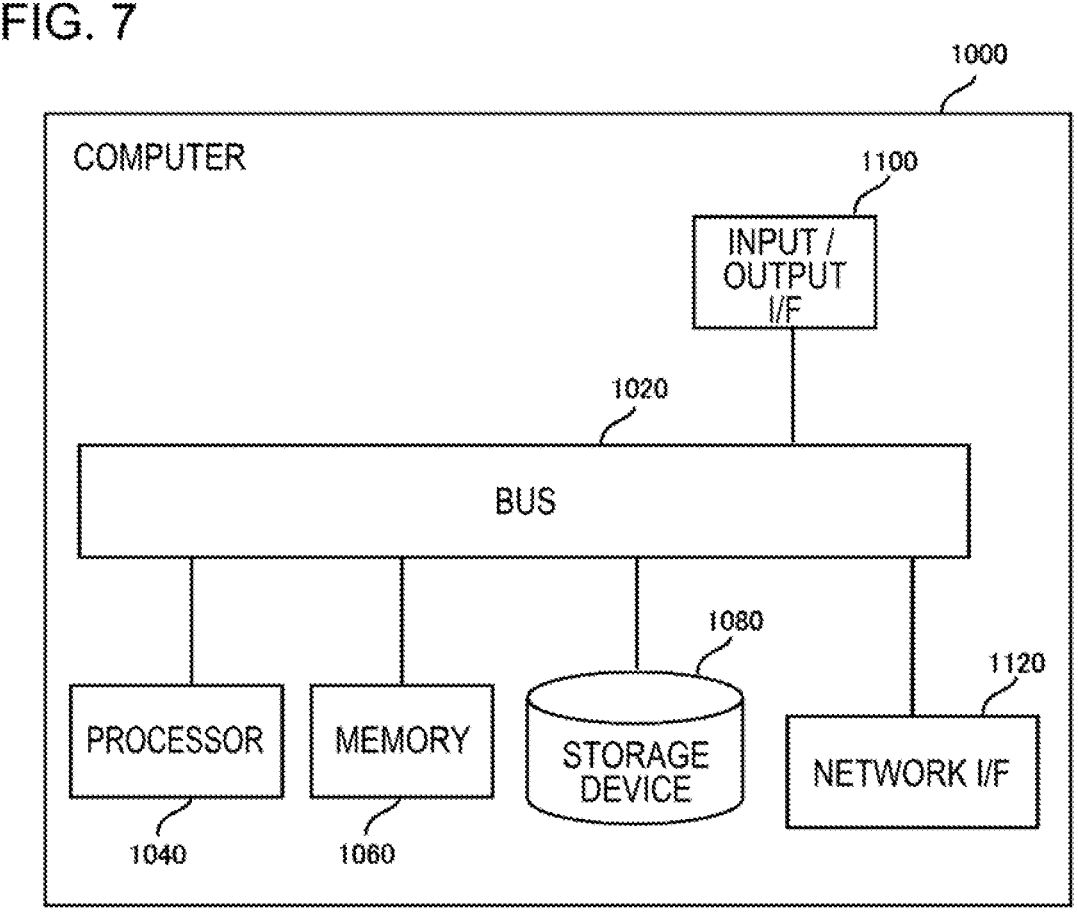
FIG. 7 is a diagram illustrating a computer for implementing an information processing apparatus.

FIG. 7 is a diagram illustrating a computer 1000 for implementing the information processing apparatus 2000. The computer 1000 is an arbitrary computer. For example, the computer 1000 is a personal computer (PC), a server machine, a tablet terminal, a smartphone, or the like. The computer 1000 may be a dedicated computer designed for implementing the information processing apparatus 2000 or a general-purpose computer.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input/output interface 1100, and the network interface 1120 transmit and receive data to and from each other. However, the method of connecting the processor 1040 and the like to each other is not limited to bus connection. The processor 1040 is an arithmetic processing apparatus such as a central processing unit (CPU) and a graphics processing unit (GPU) or the like. The memory 1060 is a main storage device implemented using a random access memory (RAM) or the like. The storage device 1080 is an auxiliary storage device implemented using a hard disk, a solid state drive (SSD), a memory card, a read only memory (ROM), or the like.

The input/output interface 1100 is an interface for connecting the computer 1000 and an input/output device. The network interface 1120 is an interface for connecting the computer 1000 to a communication network. This communication network is, for example, a local area network (LAN) or a wide area network (WAN). A method of connecting the network interface 1120 to the communication network may be a wireless connection or a wired connection.

The storage device 1080 stores a program module that implements each functional configuration unit (the feature point detection unit 2020, the determination unit 2040, the extraction unit 2060, and the comparison unit 2080) of the information processing apparatus 2000. The processor 1040 implements a function corresponding to each program module by reading each program module into the memory 1060 and executing the program module.

<Example of Use of Information Processing Apparatus 2000>

The information processing apparatus 2000 can be used in a situation where the following is useful: "each object is determined by capturing an image of a plurality of objects simultaneously with a camera and by performing image analysis on the captured image (query image 10) obtained through the image capturing". Hereinafter, some usage examples of the information processing apparatus 2000 will be described.

<<Image Recognition Point-of-Sales (POS) System>>

Generally, when a customer purchases a product at a store such as a convenience store or a supermarket, a cashier terminal (POS terminal) recognizes the product and registers the product as a payment target. Here, as one of the methods of recognizing a product, there is a method of determining a product included in a captured image by capturing an image of the product with a camera provided in a cashier terminal and analyzing the generated captured image.

The information processing apparatus 2000 can be used to register a plurality of products as payment targets simultaneously. First, a camera provided at a cashier terminal captures an image of a plurality of products at once, thereby generating a captured image including the plurality of products to be registered as the payment targets. The information processing apparatus 2000 acquires the captured image, which is obtained as described above, as the query image 10 and analyzes the image, thereby determining individual products. In such a manner, a plurality of products can be registered as payment targets at high speed.

<<Shelf Assignment Recognition System>>

In a store, products are displayed at display places such as merchandise shelves. Generally, display of products at display places is performed in accordance with a certain rule. However, a situation in which the display status of the product does not comply with the rule may occur when a person who performs a work of displaying the product displays the product in a wrong place or the product is moved by a customer.

The information processing apparatus 2000 can be used to check whether the display status of products complies with the rule. First, a camera provided in the vicinity of the display location of products captures an image of the display location, thereby generating a captured image including a plurality of products displayed at the display location. The information processing apparatus 2000 handles the captured image obtained as described above as the query image 10 and analyzes the image, thereby determining the product displayed at each position of the display location. In such a manner, since the display status of the product can be recognized by determining the product displayed at each position of the display location, by comparing the display status with the above-described rule, it is possible to check whether or not the display of the product is performed in accordance with the rule. If the information processing apparatus 2000 is used, the display status of the product can be recognized at high speed. Therefore, it is possible to check whether the display status complies with the rule at high speed.

<<Image Weight Inspection System>>

When a product is shipped at a distribution site or the like, the product is inspected. For example, it is checked whether the product to be shipped matches the product as a shipping target and whether the number of the products matches the number of products to be shipped. It should be noted that a similar check may be performed when the product is delivered.

As a system for improving efficiency of the product inspection work as described above, there is an image weight inspection system. The image weight inspection system measures a weight of a product as an inspection target while capturing an image of the product with a camera. The captured image obtained from the camera is used to determine the product as the inspection target. The weight of the product is used to determine the number of the products. For example, by capturing an image of a state in which a plurality of the same products are stacked with a camera from the top and measuring the weight simultaneously, the determination of the products based on the image and the determination of the number of the products on based on the weight are simultaneously realized.

The information processing apparatus 2000 of the present example embodiment can be used for simultaneously inspecting a plurality of types of products in the above-described image weight inspection system. First, a camera captures an image of a state in which a plurality of types of products are arranged side by side on a weight scale. The information processing apparatus 2000 determines each of the plurality of types of products as inspection targets by treating the captured image obtained as a result as the query image 10 and performing image analysis. By using the information processing apparatus 2000 in such a manner, a plurality of products as inspection targets can be determined at high speed, and high-speed inspection can be realized.

<Flow of Processing>

Figure 8:
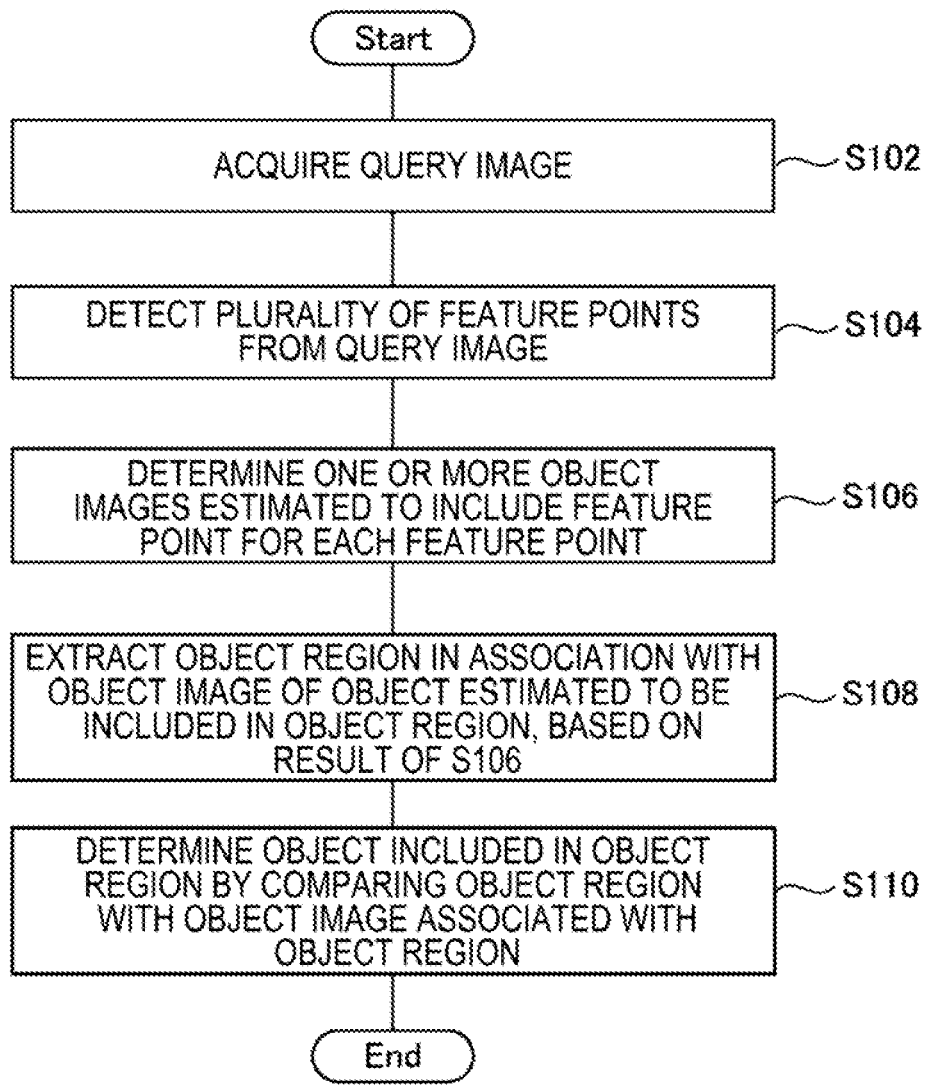
FIG. 8 is a flowchart illustrating a flow of processing executed by the information processing apparatus according to the first example embodiment.

FIG. 8 is a flowchart illustrating a flow of processing executed by the information processing apparatus 2000 according to the first example embodiment. The feature point detection unit 2020 acquires the query image 10 (S102). The feature point detection unit 2020 detects a plurality of feature points from the query image 10 (S104). The determination unit 2040 determines, for each feature point 40, one or more object images estimated to include the feature point 40 (S106). The extraction unit 2060 extracts the object regions 50 in association with the object images of the objects estimated to be included in the object regions 50 on the basis of the result of the determination (S108). The comparison unit 2080 determines the objects included in the object regions 50 by comparing the object regions 50 with the object images associated with the object regions 50 (S110).

<Acquisition of Query Image 10: S102>

The feature point detection unit 2020 acquires the query image 10. The query image 10 is an image generated by capturing an image of a plurality of objects with a camera. The camera that generates the query image 10 may be a still camera that generates a still image or a video camera that generates a video. In the latter case, the query image 10 is one of the video frames constituting the video generated by the video camera.

There are various methods by which the feature point detection unit 2020 acquires the query image 10. For example, the feature point detection unit 2020 acquires the query image 10 from the camera that generated the query image 10. In another example, the feature point detection unit 2020 acquires the query image 10 by accessing a storage device in which the query image 10 is stored. In another example, the feature point detection unit 2020 acquires the query image 10 by receiving a request including the query image 10 from a client machine that requests determination of an object included in the query image 10. In this case, the information processing apparatus 2000 transmits the result of determining the object included in the query image 10 to the client machine. The client machine described herein means any computer that transmits the above request.

<Detection of Feature Point 40: S104>

The feature point detection unit 2020 computes a plurality of feature points 40 from the query image 10. At this time, the feature point detection unit 2020 computes a local feature value for each feature point 40. Here, an existing method can be used as the method of detecting feature points from an image and the method of computing local feature values of the feature points.

<Determination of Object Image Estimated to Include Feature Point 40: S106>

The determination unit 2040 determines, for each feature point 40, one or more object images estimated to include the feature point 40 (S106). To determine object images estimated to include the feature points 40, local feature values of the feature points 40 and local feature values of feature points in the object images are used. As described above, the object information indicates the local feature value of each feature point in the object image.

Here, if there is a feature point having a local feature value similar to the local feature value of the feature point 40 in a certain object image, it can be estimated that the object image includes the feature point 40. Therefore, the determination unit 2040 determines an object image including a feature point having a local feature value similar to the local feature value of the feature point 40, and handles the object image as an object image estimated to include the feature point 40.

Here, as a method of searching for the object images including feature points having the local feature values similar to the local feature values of the feature points 40, there is a method of computing a degree of similarity between all the local feature values of the feature points 40 (all the feature value vectors) and all the local feature values of all the feature points indicated by the object information. However, the determination unit 2040 uses a method that can be realized at a higher speed than this method in order to shorten the time necessary for determining the object image estimated to include the feature point 40. Hereinafter, some specific methods will be exemplified.

<Method 1>

For example, the determination unit 2040 uses an approximate nearest neighbor search. Examples of a method of realizing the approximate nearest neighbor search include a method using hierarchical clustering and an inverse index and a method using locality sensitive hashing (LSH). Since these methods are known methods, a concrete explanation of the methods will not be described. Hereinafter, a method of determining an object image estimated to include the feature point 40 will be described using an example using a simple index table.

Figure 9:
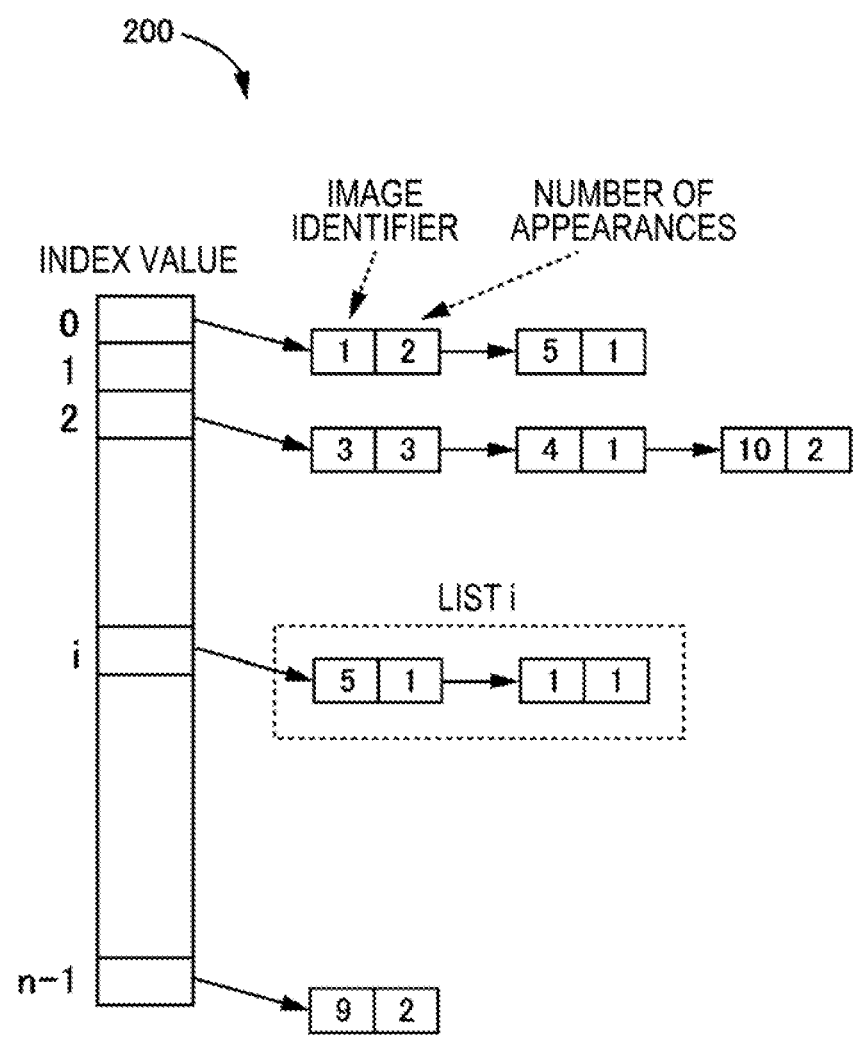
FIG. 9 is a diagram illustrating an index table.

First, as a premise, an index table is created in advance for local feature values obtained from each object image. FIG. 9 is a diagram illustrating the index table. The index table 200 has N index values to each of which a list having nodes is connected, the note having a pair of an image identifier and the number of appearances.

Each local feature value obtained from the object image is added to a list connected to an index value equal to a value obtained by quantizing the local feature value in accordance with a predetermined rule (for example, a hash function). For example, it is assumed that a feature point included in the object image 1 (the image identifier is 1) has a local feature value of F1 and this local feature value is added to the index table 200. First, the local feature value F1 is converted into an index value by quantizing the local feature value in accordance with the predetermined rule. Suppose that the index value obtained by this conversion is i. In this case, the node having the image identifier 1 of the object image 1 is added to the list connected to the index value i (hereinafter, list i). Here, when a node whose image identifier is 1 exists in the list i, the number of appearances of the node is incremented by 1. On the other hand, when the node whose image identifier is 1 does not exist in the list i, a node of "image identifier=1, number of appearances=1" is added to the list i.

The determination unit 2040 searches the index table 200 using the local feature values of the feature points 40. Specifically, the determination unit 2040 computes an index value corresponding to the local feature value by quantizing the local feature value of the feature point 40 in accordance with the predetermined rule. Then, the determination unit 2040 acquires an image identifier indicated in the list connected to the index value. The determination unit 2040 handles the object image, which has the image identifier acquired by this method, as the object image estimated to include the local feature value of the feature point 40.

Here, when the index table is configured by the above-described method, the list connected to one index value may have a plurality of nodes. Therefore, there is a possibility that there are a plurality of the image identifiers acquired by the determination unit 2040 by the above-described method. Therefore, the determination unit 2040 is able to acquire a plurality of object images estimated to include the local feature values of the feature points 40 by the above-described method.

<<Method 2>>

The determination unit 2040 compares the local feature values of the feature points 40 with the local feature values indicated by the object information (the local feature values of each object image). At this time, the determination unit 2040 does not completely compare the local feature values of the feature points 40 with the local feature values indicated by the object information, but performs the comparison in a roughly simplified manner.

For example, the determination unit 2040 compares not all the local feature values indicated in the object information, but compares only a part of the local feature values with the local feature value of the feature point 40. Specifically, the upper limit of the number of local feature values to be compared with the local feature values of the feature points 40 is determined for each object image. For example, it is assumed that there are 800 feature points in the object image 1 and 700 feature points in the object image 2. In this case, the number of local feature values to be compared with the local feature values of the feature points 40 is set to 50 for each object image. That is, among 800 feature points in the object image 1, the local feature values of 50 feature points are compared with the local feature values of the feature points 40. Similarly, among the 700 feature points in the object image 2, the local feature values of 50 feature points are compared with the local feature values of the feature points 40.

In this case, in the object information, for each object image, which feature point of the local feature value is to be used for comparison is determined in advance. For example, a feature point having a large reaction value upon detection of a feature point or a feature point having a large scale value is used.

The comparison between the local feature values is performed, for example, by computing distance values thereof. Here, an existing technique can be used as a technique of computing the distance values between the local feature values.

The determination unit 2040 determines an object image estimated to include the local feature value of the feature point 40 on the basis of the distance value computed for each local feature value indicated by the object information. For example, the determination unit 2040 determines the local feature value having the smallest computed distance value among the local feature values indicated by the object information. Then, the determination unit 2040 handles an object image including a feature point having the determined local feature value as an object image estimated to include the feature point 40.

In another example, the determination unit 2040 determines a predetermined number of local feature values in the ascending order of the distance values among the local feature values indicated by the object information. Then, the determination unit 2040 handles an object image including any one or more of the feature points having the local feature values determined here as an object image estimated to include the local feature value of the feature point 40.

In another example, the determination unit 2040 may evaluate the distance value computed for each local feature value indicated by the object information on the basis of a comparison with the minimum distance value among the distance values. For example, the determination unit 2040 computes a ratio between the distance value, which is computed for each local feature value indicated by the object information, and the minimum value among the distance values. For example, if the minimum distance value is d, the determination unit 2040 computes the ratio by dividing the distance value computed for each local feature value indicated by the object information by d. For example, the determination unit 2040 handles each object image, which includes a feature point having a local feature value whose ratio is equal to or less than a predetermined value, as an object image estimated to include the feature point 40.

Here, the determination unit 2040 may compute differences with the minimum distance value instead of computing the ratios with the minimum distance value. In this case, the determination unit 2040 handles each object image, which includes a feature point having a local feature value whose computed difference is equal to or less than a predetermined value, as an object image estimated to include the feature point 40.

Here, the distance value between the local feature value of the feature point 40 and the local feature value of the object image may be computed using only a part of the vector (hereinafter, partial vectors) constituting the local feature value. For example, in a case where the vector constituting the local feature value have 128 dimensions, a vector having the upper 32 dimensions of the vector are used as the partial vector.

When computing the distance values using the partial vector, the determination unit 2040 may compare all the local feature values indicated by the object information with the local feature values of the feature points 40. For example, it is assumed that the object image 1 includes 800 feature points and the object image 2 includes 700 feature points. In this case, the determination unit 2040 computes a distance value between the partial vector of the local feature value of each of the 800 feature points of the object image 1 and the partial vector of the local feature value of the feature point 40. Similarly, the determination unit 2040 computes a distance value between the partial vector of the local feature value of each of the 700 feature points of the object image 2 and the partial vector of the local feature value of the feature point 40.

<Extraction of Object Region 50>

The extraction unit 2060 extracts the object region 50 in association with the object image of the object estimated to be included in the object region 50 (S108). For this reason, the extraction unit 2060 associates the image identifiers of the object image corresponding to the feature points 40 (the object image estimated to include the feature points 40) with the image positions on the query image 10 corresponding to the feature points 40. Hereinafter, associating the image identifiers of the object image with image positions on the query image 10 is also referred to as "voting". The image positions, at which the image identifiers are voted, on the query image 10 corresponding to the feature points 40 are also referred to as "voting positions corresponding to the feature points 40".

Here, each voting position corresponding to the feature point 40 (the position on the query image 10 corresponding to the feature point 40) may be the image position itself of the feature point 40 or may be another position which has a predetermined relationship with the feature point 40. In the following description, first, a case where the image position of the feature point 40 itself is handled as a voting position corresponding to the feature point 40 will be exemplified. In addition, a case where "another position having a predetermined relationship with the feature point 40" is handled as a voting position corresponding to the feature point 40 will be described later.

If each voting position corresponding to the feature point 40 is the image position of the feature point 40 itself, the relationship between the voting position and the image identifier associated therewith is exemplified in FIG. 3 described above. In FIG. 3, [n] (n is an integer) indicates a situation where the image identifier n is being voted at the voting position.

The extraction unit 2060 extracts the object regions 50 in association with the image identifiers on the basis of the association between the voting positions and the image identifiers. Conceptually, when many same image identifiers are associated with voting positions close to each other (that is, when the same image identifiers are concentrated in places close to each other), the image regions including the voting positions and the surroundings thereof are extracted as the object regions 50 corresponding to that image identifiers. This increases the probability that the object region 50 includes an object represented by an object image having associated image identifiers.

Hereinafter, several specific methods for extracting the object regions 50 in association with the image identifiers will be described.

<<Method 1>>

The extraction unit 2060 clusters the voting positions for each image identifier using spatial clustering. As a result, the extraction unit 2060 is able to obtain, from the query image 10, a combination of "an image identifier, an image region (hereinafter, a cluster region) including each voting position where the image identifier is voted, and the number of votes" for each image identifier. If the same image identifiers are voted at distant positions, those image identifiers are clustered into separate clusters. That is, a plurality of clusters can be created for one image identifier.

Figure 10:
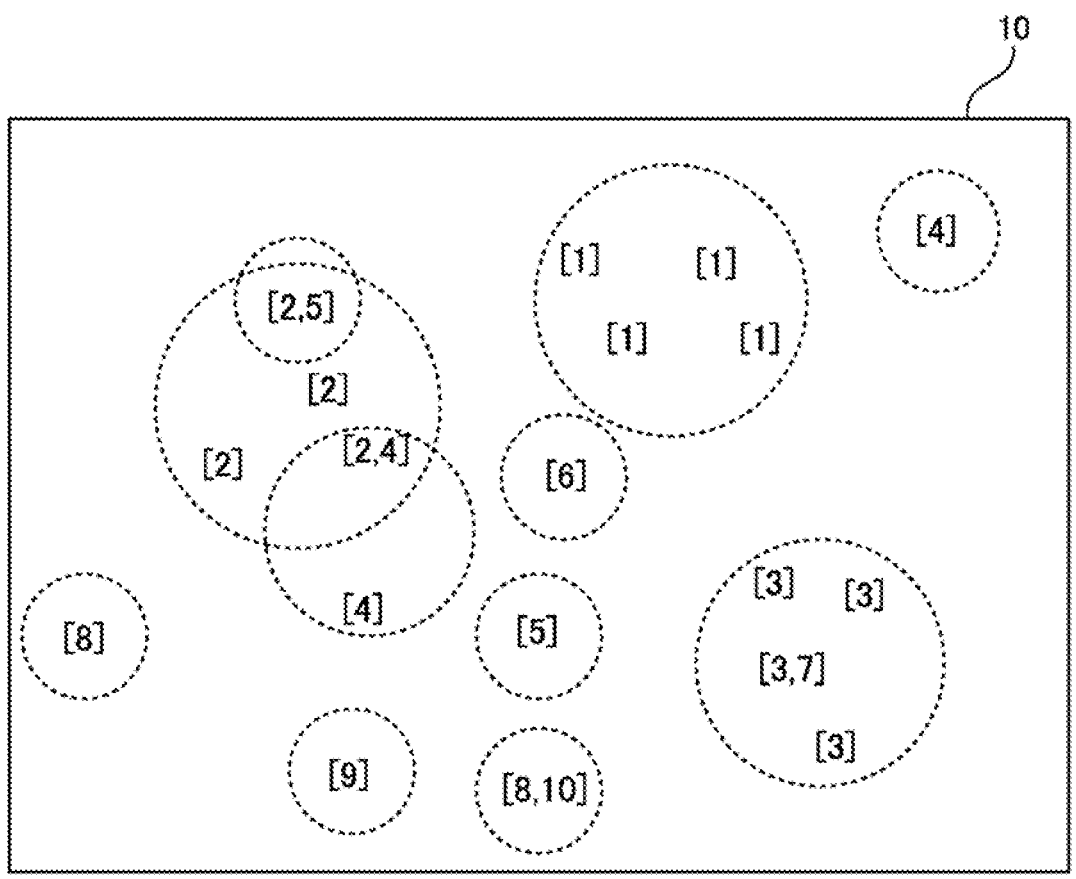
FIG. 10 is a diagram illustrating a state where voting positions are clustered for each image identifier.

FIG. 10 is a diagram illustrating a state where the voting positions are clustered for each image identifier. In FIG. 10, there are voting positions where a plurality of image identifiers are voted. For example, [2, 5] indicates that the image identifiers 2 and 5 have been voted at the same voting position. In FIG. 10, a region surrounded by the dotted line represents a cluster region.

Here, the number of votes associated with "an image identifier and a cluster region" is, for example, represented by the number of voting positions that are associated with the image identifier and included in the cluster region. In another example, when a weight is assigned to each voting position as described later, the number of votes associated with "the image identifier and the cluster region" may be the sum of the weights of the voting positions that are associated with the image identifier and included in the cluster region. An existing method can be used as a specific method of spatial clustering.

The extraction unit 2060 extracts a cluster whose number of votes is equal to or greater than a predetermined value, from among the clusters obtained by the spatial clustering. Then, for each extracted cluster, the extraction unit 2060 handles a combination of the image identifier and the cluster region indicated by the cluster as a combination of the image identifier and the object region 50.

<<<Weight of Voting Position>>>

The weight of the voting position will be described. When voting the image identifier of the object image for the voting position corresponding to the feature point 40, the extraction unit 2060 may determine the weight of the image identifier for the voting position. The probability that the object image having the image identifier includes the feature point 40 is reflected into the weight of the image identifier at the voting position corresponding to the feature point 40.

For example, as the number of object images estimated to include the feature points 40 increases, the extraction unit 2060 reduces the weight of each image identifier at the voting position corresponding to the feature point 40. This is because, as the number of object images estimated to include the feature points 40 increases, the probability that each object image includes the feature point 40 decreases. For example, the weight of each image identifier at the voting position corresponding to the feature point 40 is set as an inverse of the number of object images associated with the feature point 40.

For example, it is assumed that the image identifiers associated with the feature point 40 are image identifiers 1 and 2. In this case, each weight of the image identifiers 1 and 2 at the voting position corresponding to the feature point 40 is 0.5. It is also assumed that the image identifiers associated with the feature point 40 are the image identifiers 1, 2, and 3. In this case, each weights of the image identifiers 1, 2, and 3 at the voting position corresponding to the feature point 40 is 0.33.

In another example, the extraction unit 2060 determines the weight of the image identifier at the voting position corresponding to the feature point 40, by the degree of similarity between the feature point, which is included in the object image having the image identifier, and the feature point 40 (for example, the distance value between the above-described local feature values). It can be inferred that the greater the degree of similarity between the feature point 40 and the feature point included in a certain object image, the higher the probability that the object image includes the feature point 40. Therefore, for example, the extraction unit 2060 handles the weight of the image identifier at the voting position corresponding to the feature point 40 as a value that increases in inverse proportion to the distance value between the feature point, which is included in the object image having the image identifier, and the feature point 40.

For example, it is assumed that the determination unit 2040 estimates that the object image 1 includes the feature point 40 on the basis of the distance value between the feature value of the feature point 40 and the feature value of a certain feature point included in the object image 1. In this case, the extraction unit 2060 determines the weight of the object image 1 at the voting position corresponding to the feature point 40 on the basis of the distance value.

<<Method 2>>

The extraction unit 2060 divides the query image 10 into a plurality of blocks, and extracts the object regions 50 by using the blocks. Specifically, the extraction unit 2060 computes the number of votes of each block on the basis of the voting positions included in each block. For example, the extraction unit 2060 handles the number of voting positions present in a certain block as the number of votes of the block. In another example, when a weight is assigned to the voting positions by the above-described method, the extraction unit 2060 may use the sum of the weights of the voting positions present in the block as the number of votes of the block. Here, the number of votes is computed for each image identifier.

Figure 11:
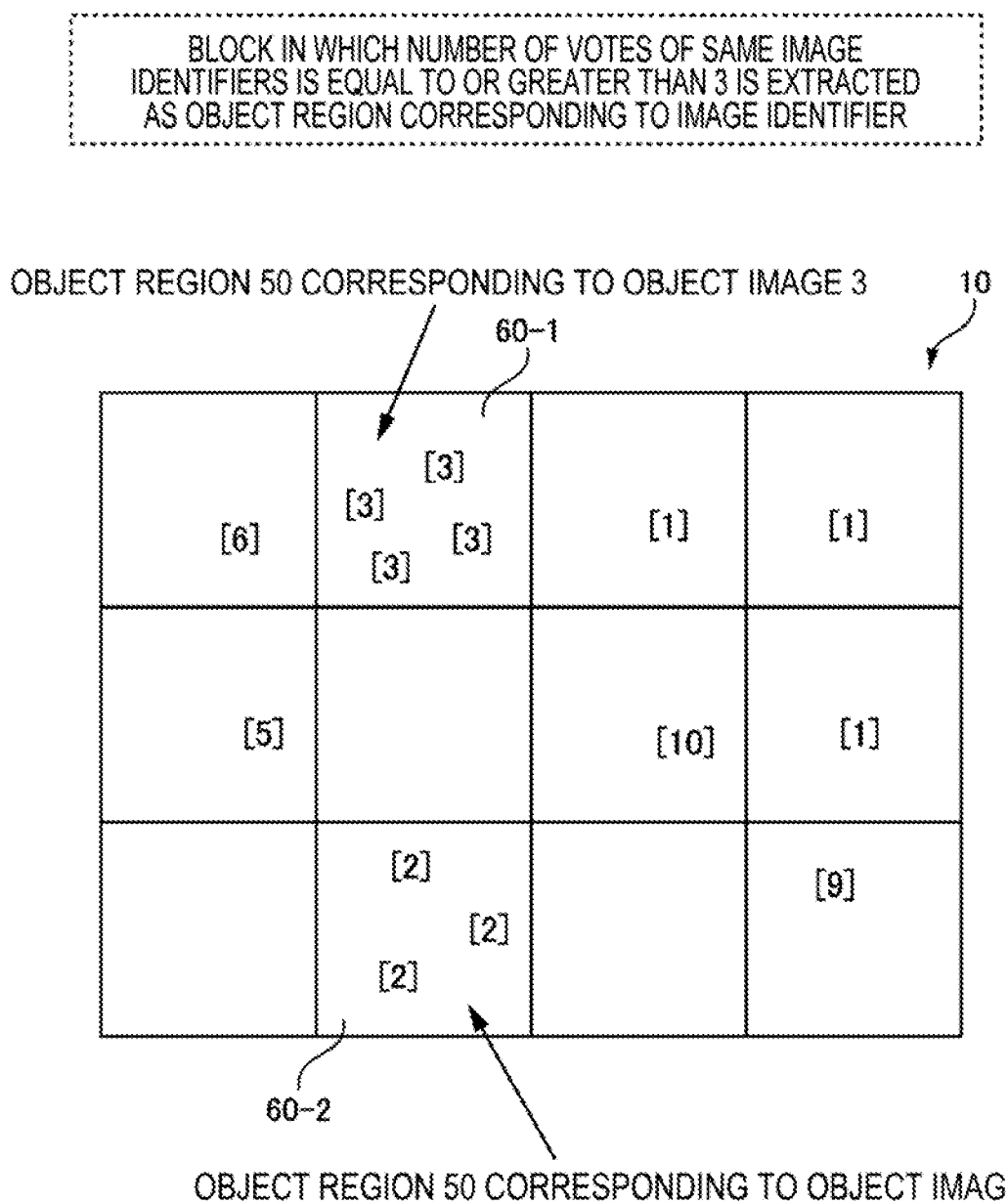
FIG. 11 is a diagram illustrating a case in which blocks having a predetermined number of votes or more are extracted as object regions.

For example, the extraction unit 2060 extracts a block whose number of votes relating to a certain image identifier is equal to or greater than a predetermined value, as the object region 50 corresponding to the image identifier. FIG. 11 is a diagram illustrating an example of a case in which blocks having a predetermined number of votes or more are extracted as the object regions 50. In FIG. 11, the query image 10 is divided into 12 blocks. In this example, a block whose number of votes of the same image identifiers is 3 or more is extracted as the object region 50. The number of votes is represented by the number of image identifiers.

The query image 10 has two blocks including three or more same image identifiers. Specifically, the block 60-1 includes three image identifiers 2, and the block 60-2 includes four image identifiers 3. Therefore, the extraction unit 2060 extracts the block 60-1 as the object region 50 corresponding to the image identifiers 3. Further, the extraction unit 2060 extracts the block 60-2 as the object region 50 corresponding to the image identifiers 2.

Note that blocks may partially overlap with each other. When the image is divided into blocks, an existing technique can be used as a method of dividing the blocks so as to partially overlap with each other.

Figure 12:
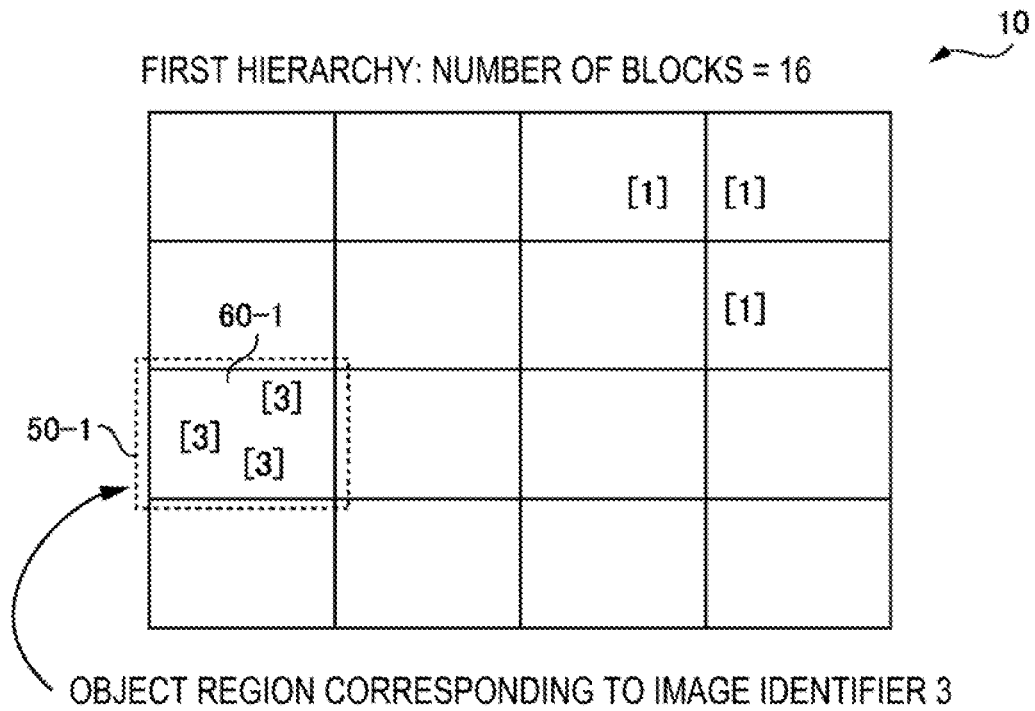
FIG. 12 is a diagram illustrating hierarchically structured blocks.
Figure 12:
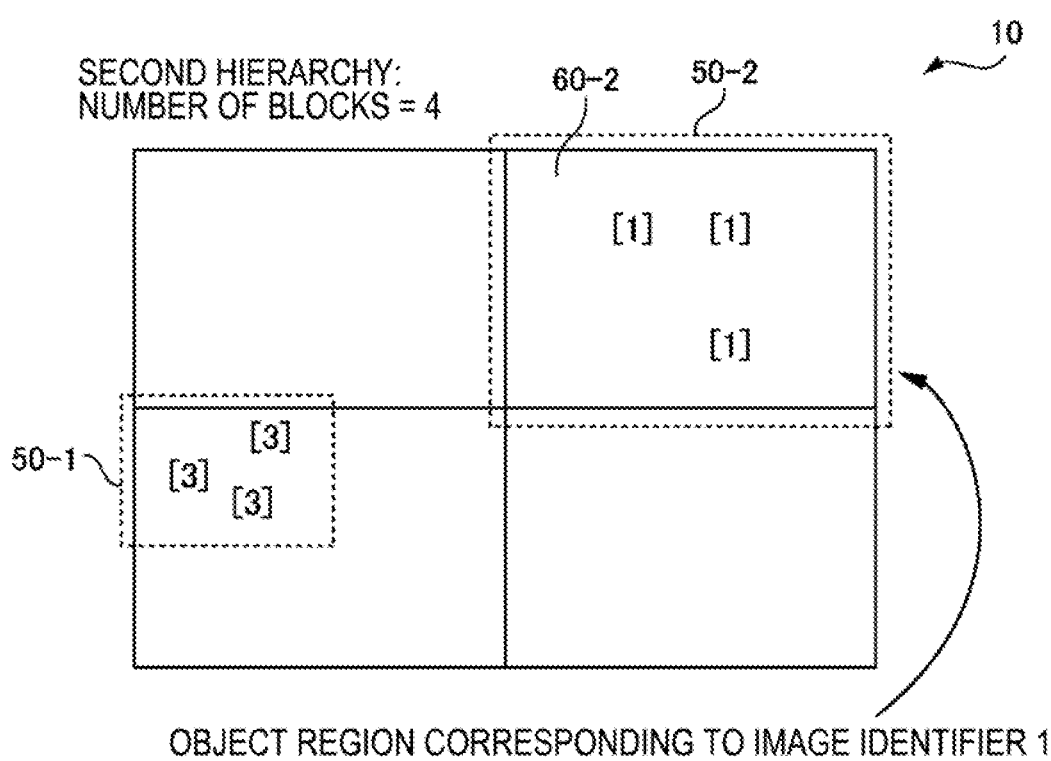

Further, the block division may be hierarchical. FIG. 12 is a diagram illustrating an example of a hierarchically structured block. The upper part of FIG. 12 shows the block division in the first hierarchy. Here, the query image 10 is divided into 16 blocks. On the other hand, the lower part of FIG. 12 shows the block division in the second hierarchy. Here, the query image 10 is divided into 4 blocks. Each block in the query image 10 of the lower part is a combination of 4 blocks in the query image 10 of the upper part. Note that the dotted line in the query image 10 of the lower part is a line corresponding to the boundary between blocks in the query image 10 of the upper part.

The extraction unit 2060 determines whether or not the number of votes of the same image identifiers is equal to or greater than a predetermined number in each block in order from the hierarchy divided into finer blocks. For example, in the example of FIG. 12, the determination is first performed for each block of the first hierarchy, and then the determination is performed for each block of the second hierarchy. Here, in the example of FIG. 12, it is assumed that the predetermined number is 3, and the number of votes is the number of voting positions.

First, in the first hierarchy, the extraction unit 2060 determines that the number of votes of the image identifiers 3 in the block 60-1 is 3, which is equal to or greater than the predetermined number. As a result, the block 60-1 is extracted as the object region 50 corresponding to the image identifiers 3. On the other hand, each block including the image identifier 1 is not extracted as the object region 50 since the number of votes is less than 3 in any block.

Next, the extraction unit 2060 makes determination on each block of the second hierarchy. As a result, the extraction unit 2060 determines that the number of votes of the image identifiers 1 in the block 60-2 is 3, which is equal to or greater than the predetermined number. As a result, the block 60-2 is extracted as the object region 50 corresponding to the image identifiers 1.

Note that the extraction unit 2060 may handle the image region including the peripheral region thereof as the object region 50 instead of handling the cluster region extracted by the above-described method 1 or the image region of the block extracted by the method 2 as the object region 50. As a method of extracting the image region and the peripheral region thereof, for example, a method of extracting an enlarged image region at a predetermined ratio can be adopted. This predetermined ratio is determined in advance.

<<Image Position on Query Image 10 Corresponding to Feature Point 40>>

As described above, the extraction unit 2060 may treat "another position having a predetermined relationship with the feature point 40" as a voting position corresponding to the feature point 40. For example, the extraction unit 2060 determines a voting position corresponding to the feature point 40 on the basis of a reference position determined in an object image estimated to include the feature point 40.

Figure 13:
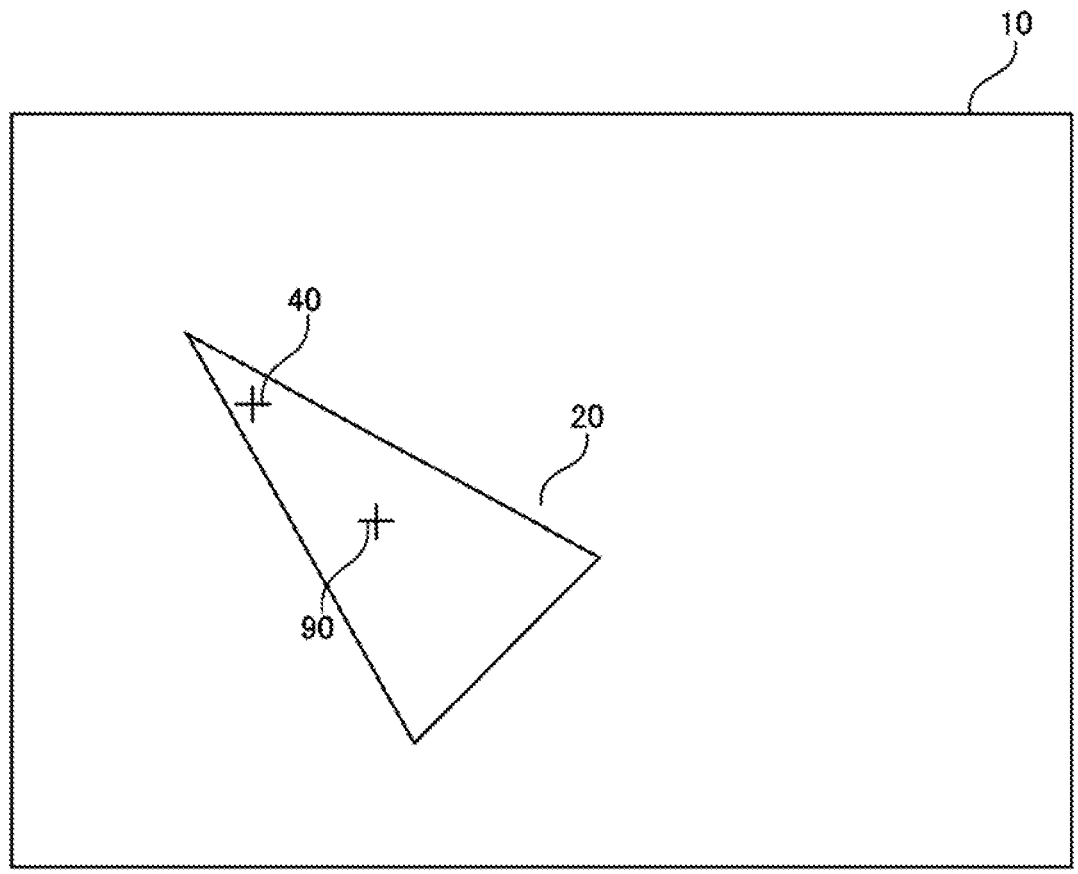
FIG. 13 is a diagram illustrating a case where a voting position corresponding to a feature point is determined on the basis of a reference position of an object image.
Figure 13:
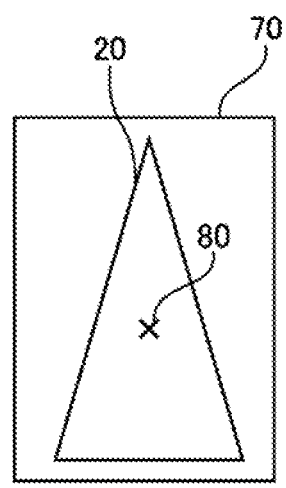

FIG. 13 is a diagram illustrating a case where the voting position corresponding to the feature point 40 is determined on the basis of the reference position of the object image. In this example, an elongated triangular object 20 is included in the query image 10. An object image 70 illustrated below the query image 10 is an object image representing the object 20.

A reference position 80 is determined in the object image 70. For example, the reference position 80 is the center position of the object 20. The comparison unit 2080 sets the voting position corresponding to the feature point 40 as a position corresponding to the reference position 80 in the object image 70 in the query image 10. In FIG. 13, the position on the query image 10 corresponding to the reference position 80 in the object image 70 is a position 90. Therefore, the extraction unit 2060 sets the position 90 as the voting position corresponding to the feature point 40. In principle, in the query image 10, each of the voting positions corresponding to the plurality of feature points 40 detected from the object 20 is set as the position 90.

Here, the object included in the query image 10 is different from the object included in the object image in terms of a scale of magnitude and a direction. Therefore, in order to compute the image position corresponding to the reference position of the object image on the query image 10, computation taking the difference in the scale and the direction into account is required.

Therefore, as a premise, a reference vector whose initial point is the reference position is defined in the object image. A magnitude and a direction of the reference vector are arbitrary. Further, for each feature point in the object image, a feature vector whose initial point is the feature point is defined. Here, in scaled invariance feature transform (SIFT) and speeded up robust features (SURF) which are types of algorithms for computing local feature values, a scale (magnitude) and an orientation (direction) are computed for each feature point. Therefore, as the magnitude and the direction of the feature vector of the feature point, the scale and the orientation computed for the feature point are used.

In addition, a feature vector is similarly obtained for the feature point 40 on the query image 10. The feature vector of the feature point 40 can be obtained in the process of computing the feature value of the feature point 40.

Here, in the object image, when a predetermined conversion expression based on the relationship between the positions, the magnitudes, and the orientations of a certain feature vector and a reference vector is applied to the feature vector, the feature vector can be converted into the reference vector. In this conversion, assuming that the feature vector is fv, the reference vector is rv, and the conversion expression is f, this conversion is represented by rv=f(fv). Then, in the query image 10, if this conversion expression is applied to the feature vector of the feature point 40, the feature vector is converted into a vector corresponding to the reference vector in the object image. That is, assuming that the feature vector of the feature point 40 is gv, by computing f(gv), a vector corresponding to the reference vector can be computed.

Then, the comparison unit 2080 converts the feature vector into a vector corresponding to a reference vector in the object image by applying the conversion expression to the feature vector of the feature point 40. Then, the comparison unit 2080 sets the initial point of the vector obtained by this conversion as the voting position corresponding to the feature point 40.

Figure 14:
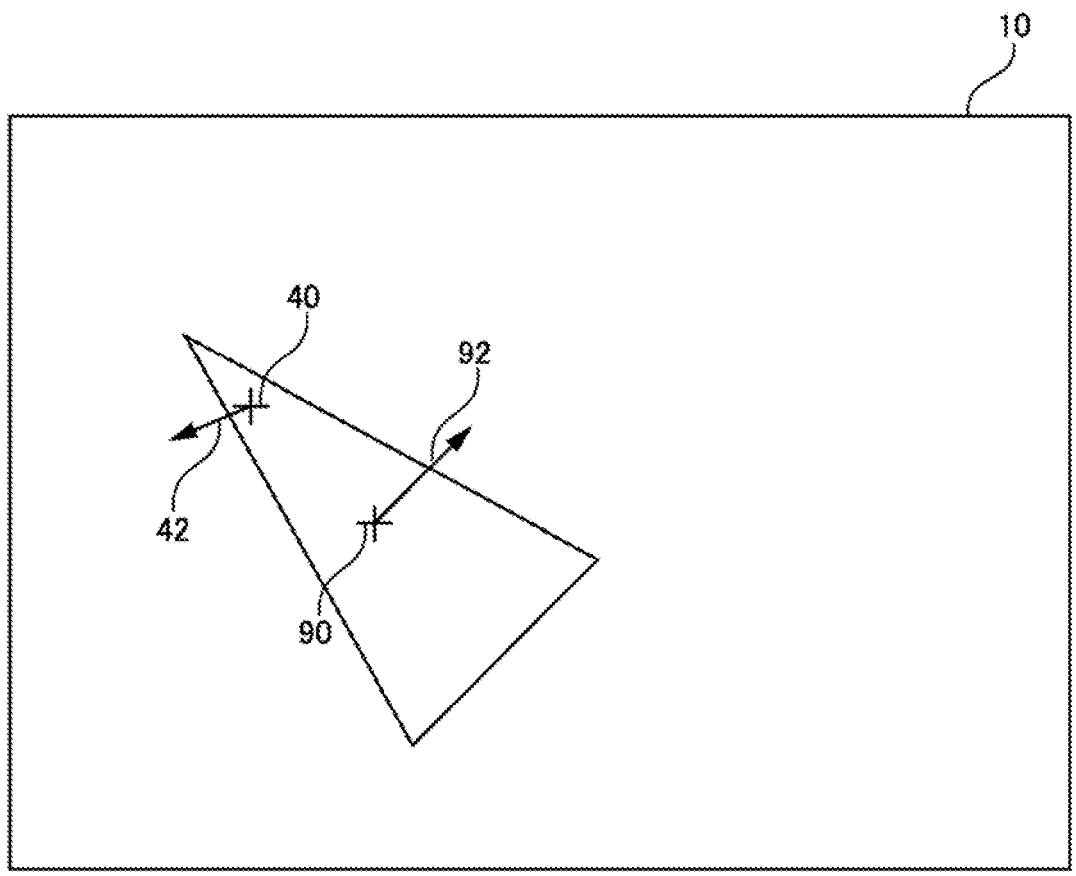
FIG. 14 is a diagram illustrating a method of computing a voting position corresponding to a feature point using a feature vector and a reference vector.
Figure 14:
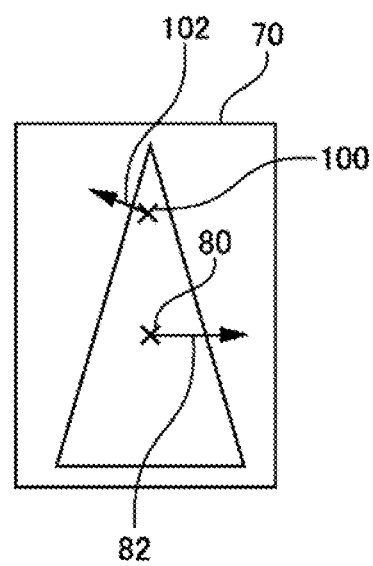

FIG. 14 is a diagram illustrating a method of computing a voting position corresponding to the feature point 40 by using the feature vector and the reference vector. In the object image 70, a reference vector 82 corresponding to the reference position 80 and a feature vector 102 corresponding to the feature point 100 are defined. The feature point 40 in the query image 10 is a feature point corresponding to the feature point 100 in the object image 70. Therefore, the extraction unit 2060 applies a conversion expression, which is for converting the feature vector 102 into the reference vector 82, to the feature vector 42 computed for the feature point 40. As a result, a vector 92 is obtained. Therefore, the extraction unit 2060 handles a position 90, which is obtained as the initial point of the vector 92, as the voting position corresponding to the feature point 40.

Here, when there are a plurality of object images estimated to include the feature points 40, the comparison unit 2080 obtains an image position corresponding to the feature point 40 for each object image. That is, a plurality of image positions corresponding to the feature points 40 are obtained. Here, for each of the plurality of obtained image positions, the image identifier of the object image used for obtaining the image position is voted.

Figure 15:
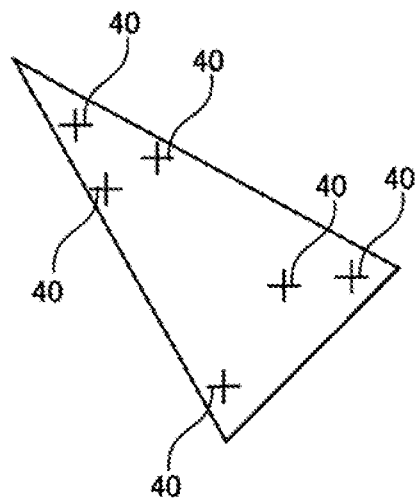
FIG. 15 is a diagram illustrating a state in which voting positions corresponding to feature points are gathered at positions close to each other.
Figure 15:
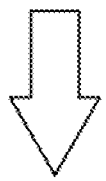
Figure 15:
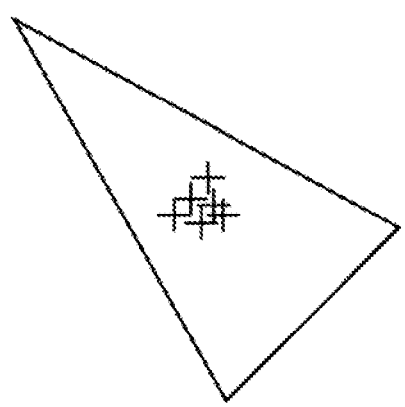

When each feature point 40 in the query image 10 is converted into a position corresponding to the reference position of the object image in such a manner, the feature points 40 included in the same object image are converted to positions close to each other. Therefore, by computing the image positions in the query image 10 corresponding to the feature points 40 with this method, it is possible to gather the feature points 40 of the same object at close positions. FIG. 15 is a diagram illustrating an example of a state in which the voting positions corresponding to the feature points 40 are gathered at positions close to each other.

If the feature points 40 of the same object are gathered at close positions in such a manner and then spatial clustering or the like is executed, the object region 50 representing the object can be more accurately extracted. However, in this case, it is preferable that the extraction unit 2060 performs spatial clustering or the like in a state where the feature points 40 are converted into positions corresponding to the reference position of the object image, and then extracts an image region, which includes the original positions of the feature points 40 included in the same cluster or block (positions before conversion into positions corresponding to the reference position) as the object region 50.

<Comparison of Object Region 50 with Object Image: S110>

The comparison unit 2080 determines the object included in the object region 50 by comparing the object region 50 with one or more object images. Here, the object image used for comparison with the object region 50 is an object image having an image identifier associated with the object region 50. Note that the comparison between the object region 50 and the object image is performed by comparing the local feature value of each feature point 40 included in the object region 50 with the local feature value of each feature point included in the corresponding object image. Note that an existing technique can be used as a technique of comparing images by comparing local feature values.

As described above, when the determination unit 2040 compares the local feature value of the feature point 40 with the local feature value indicated by the object information, simplified comparison is performed. On the other hand, it is preferable that the comparison unit 2080 performs the comparison between the local feature values in detail. Specifically, it is preferable that the comparison unit 2080 compares all the local feature values of the feature points 40 included in the object region 50 with all the local feature values of the feature points included in the corresponding object image (without either reducing the number of dimensions of the local feature values or limiting the number of feature points). Here, since the number of object images to be compared with the object region 50 is narrowed down, even if the local feature values are compared in detail, it can be inferred that the time necessary for the comparison is short.

Here, for example, in the example of FIG. 5 or the like, there is only one object image to be compared with the object region 50. However, the object information may include a plurality of similar objects (for example, the objects indicated in the object information may include sweets having different tastes and drinks having different amounts in the same series). In this case, in the simplified comparison between the local feature values which is performed by the determination unit 2040, all the object images of the similar objects may include the same feature point 40. As a result, a plurality of image identifiers corresponding to the object region 50 may exist. When a plurality of image identifiers are associated with one object region 50 in such a manner, the comparison unit 2080 determines which is the image identifier of the object image whose object is included in the object region 50.

Although example embodiments of the present invention have hitherto been described with reference to drawings, the example embodiments are examples of the present invention, and various configurations other than the above may be adopted.

The invention claimed is:

1. An information processing apparatus comprising:
at least one memory configured to store instructions; and
at least one processor configured to execute the instructions to perform operations comprising:
acquiring a query image including a plurality of objects and detecting a plurality of feature points from the acquired query image;
determining one or more object images estimated to include the feature point for each feature point;
extracting an object region estimated to include an object in the query image in association with an object image of the object estimated to be included in the object region, based on a result of the determination; and
identifying an object included in the object region by comparing the object region with the object image associated with the object region.

2. The information processing apparatus according to claim 1,
wherein when the local feature value of the feature point included in an object image is similar to the local feature value of the feature point in the query image,
the operations further comprising determining the object image as the object image estimated to include the feature point in the query image.

3. The information processing apparatus according to claim 2,
wherein the operations further comprising computing a degree of similarity between the local feature value of the feature point and the local feature value of the feature point in the query image, for some of the feature points included in the object image.

4. The information processing apparatus according to claim 3,
wherein the operations further comprising computing, as the degree of similarity, a distance value between a part of a vector constituting the local feature value of the feature point included in the object image and a part of a vector constituting the local feature value of the feature point in the query image.

5. The information processing apparatus according to claim 1,
wherein an image identifier of each of the object images is stored in a storage device in association with an index value computed using the local feature value of each feature point included in the object image, and
wherein the operations further comprising computing an index value from the local feature value of the feature point in the query image, and determining an object image having the image identifier, which is stored in association with the index value, as the object image estimated to include the feature point.

6. The information processing apparatus according to claim 1,
wherein the operations further comprising performing:
setting an image position corresponding to the feature point in the query image as a voting position of the feature point; associating the voting position with the object image estimated to include the feature point; and extracting, as the object region corresponding to the object, an image region in the query image including a predetermined number or more of the voting positions associated with the same object image.

7. The information processing apparatus according to claim 6,
wherein the voting position of the feature point is an image position of the feature point.

8. The information processing apparatus according to claim 6,
wherein, in the object image,
a reference vector starting from a position of a reference point is defined, and
a feature vector, whose initial point, direction, and magnitude are respectively a position of the feature point, an orientation of the local feature value of the feature point, and a scale of the local feature value of the feature point, is defined, and
wherein the operations further comprising performing:
computing, for the feature point in the query image, a feature vector whose initial point, direction, and magnitude are respectively a position of the feature point, an orientation of the local feature value of the feature point, and a scale of the local feature value of the feature point, and
applying a conversion expression, which is for converting a feature vector of a feature point corresponding to the feature point in the object image estimated to include the feature point in the query image into the reference vector, to the feature vector of the feature point in the query image, thereby converting the feature vector and setting an image position at which an initial point of the vector after the conversion is the voting position of the feature point in the query image.

9. The information processing apparatus according to claim 1,
wherein the operations further comprising performing:
setting an image position corresponding to the feature point in the query image as a voting position; associating the voting position with the object image estimated to include the feature point by assigning a weight to the voting position; and extracting, as the object region corresponding to the object, an image region in the query image in which the sum of the weights assigned to the voting positions associated with the same object image is equal to or greater than a predetermined value.

10. A control method executed by a computer, the control method comprising:

acquiring a query image including a plurality of objects and detecting a plurality of feature points from the acquired query image;

determining one or more object images estimated to include the feature point for each feature point;

extracting an object region estimated to include an object in the query image in association with an object image of the object estimated to be included in the object region, based on a result of the determination; and identifying an object included in the object region by comparing the object region with the object image associated with the object region.

11. A non-transitory computer-readable storage medium storing a program causing a computer to execute each step of the control method according to claim 10.

* * * * *